(12) United States Patent
Okada et al.

(10) Patent No.: US 7,413,046 B2
(45) Date of Patent: Aug. 19, 2008

(54) SNOWMOBILE

(75) Inventors: Hiroyuki Okada, Shizuoka (JP);
Koutarou Ogura, Shizuoka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 159 days.

(21) Appl. No.: 11/533,011

(22) Filed: Sep. 19, 2006

(65) Prior Publication Data

US 2007/0284171 A1 Dec. 13, 2007

Related U.S. Application Data

(60) Provisional application No. 60/822,056, filed on Aug. 10, 2006.

(51) Int. Cl.
*B62M 29/00* (2006.01)

(52) U.S. Cl. ............................ 180/182; 180/190

(58) Field of Classification Search ............. 180/182, 180/186, 190
See application file for complete search history.

(56) References Cited

U.S. PATENT DOCUMENTS 7,096,988 B2 * 8/2006 Moriyama .............. 180/190

FOREIGN PATENT DOCUMENTS

JP        2005-193788 A     7/2005

* cited by examiner

*Primary Examiner*—Lesley D. Morris
*Assistant Examiner*—Michael Stabley
(74) *Attorney, Agent, or Firm*—Keating & Bennett, LLP

(57) ABSTRACT

A snowmobile includes an engine room accommodating an engine body, a steering shaft transferring a steering force generated by the steering of a handle to steering skis, and an assist motor accommodated in the engine room and assisting the steering force, wherein the assist motor is mounted to the steering shaft and located ahead of an uppermost portion of the engine body.

10 Claims, 3 Drawing Sheets

SNOWMOBILE

BACKGROUND OF THE INVENTION

1. Field of the Invention

The present invention relates to a snowmobile equipped with a power steering system having an assist motor with a high cooling capability.

2. Description of the Related Art

Known snowmobiles include a snowmobile equipped with a power steering system having an assist motor. In this power steering system, the power of the assist motor assists a steering force generated when the driver of the snowmobile steers the handle.

JP-A-2005-193788 describes a snowmobile equipped with a power steering system. The snowmobile accommodates an assist motor and an assist mechanism that transfers the power of the assist motor to the steering shaft in an engine room.

The power steering system eliminates the need for the driver of the snowmobile to steer the handle by a large force to adjust the direction of the steering skis or the direction of the snowmobile.

However, since the assist motor of the snowmobile is mounted to the steering shaft behind the engine, its cooling capability is low.

SUMMARY OF THE INVENTION

In order to overcome the problems described above, preferred embodiments of the present invention provide a snowmobile equipped with a power steering system having an assist motor with a high cooling capability.

According to a preferred embodiment of the present invention, a snowmobile includes an engine room accommodating an engine, a steering shaft transferring a steering force generated by the steering of a handle to steering skis, and an assist motor accommodated in the engine room and assisting the steering force, wherein the assist motor is mounted to the steering shaft and located ahead of an uppermost portion of the engine.

Preferably, the assist motor is located above the uppermost portion of the engine.

Preferably, the engine includes a plurality of cylinders arranged in parallel with the width direction of the snowmobile, and the steering shaft is arranged ahead of the engine.

Preferably, the axis of the plurality of cylinders extends toward the rear of the snowmobile in a slanting direction as viewed from the side of the snowmobile, and the steering shaft extends substantially parallel with the axis of the plurality of cylinders as viewed from the side of the snowmobile.

Preferably, the snowmobile further includes an exhaust pipe connected to the engine and extending to the rear of the snowmobile.

Preferably, the snowmobile further includes an intake unit located between the assist motor and the engine.

Preferably, the snowmobile further includes a cowling defining the front surface of the snowmobile, wherein the cowling has an opening for taking in outside air, and the assist motor is disposed inside the cowling.

Preferably, the opening is provided in a position where at least a portion of the opening overlaps with the assist motor as viewed from the front of the snowmobile.

Preferably, the snowmobile further includes a duct inside the cowling, wherein the duct is connected at the front end to the opening, and directed at the rear end to the assist motor.

Preferably, the engine is of a dry sump type, and the assist motor is disposed above the engine.

The snowmobile according to the preferred embodiments of the present invention is constructed such that the assist motor is mounted to the steering shaft and located ahead of the uppermost portion of the engine. This arrangement enables the assist motor to be disposed in a position that is suitable for cooling such as a position in which it can easily receive outside air (running wind) from ahead of the snowmobile. Accordingly, in the snowmobile according to the preferred embodiments of the present invention, the assist motor of the power steering system has a high cooling capability.

Other features, elements, steps, characteristics and advantages of the present invention will become more apparent from the following detailed description of preferred embodiments of the present invention with reference to the attached drawings.

DETAILED DESCRIPTION OF PREFERRED EMBODIMENTS

A snowmobile according to preferred embodiments of the present invention will be described hereinafter with reference to the drawings.

Figure 1:
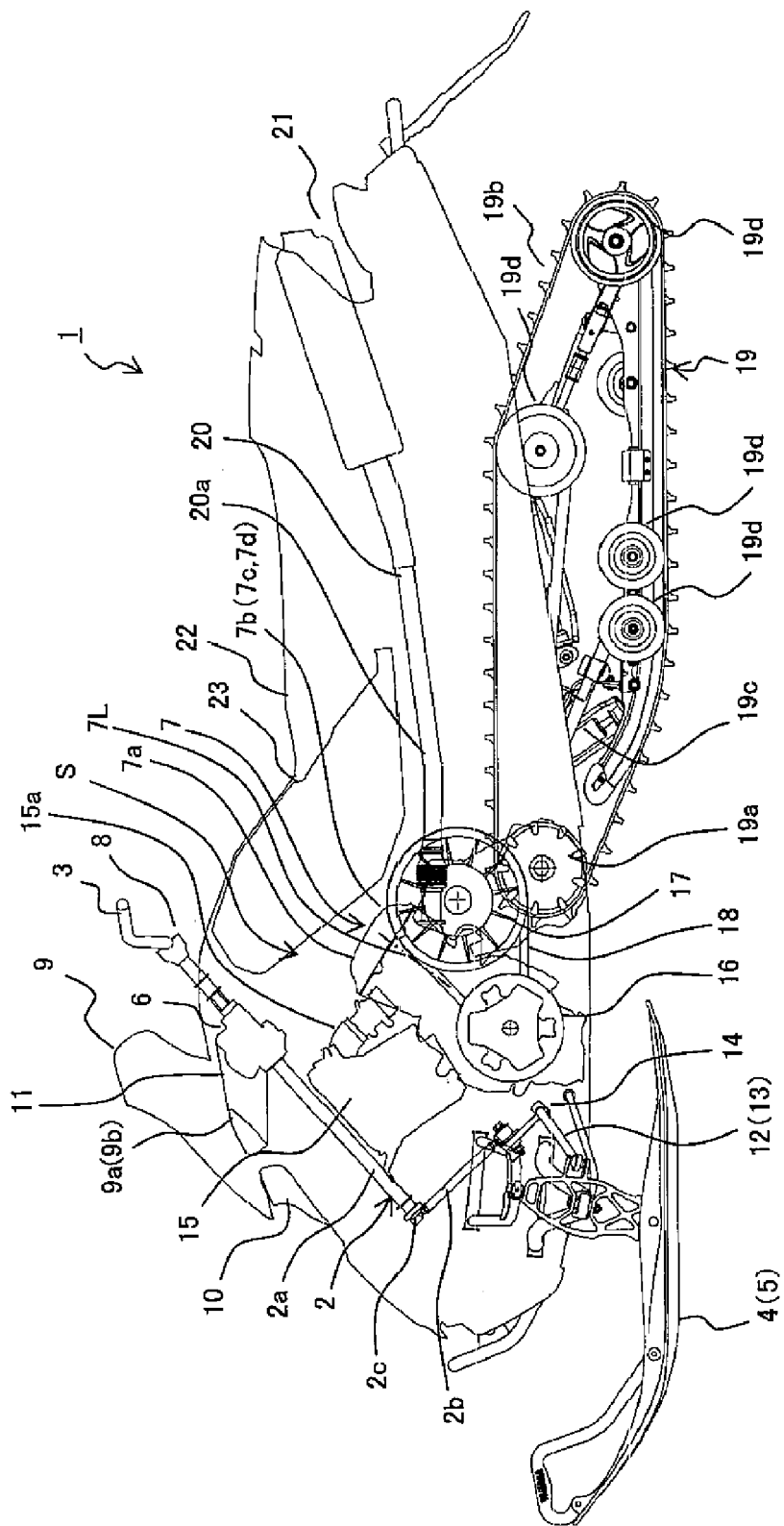
FIG. 1 is a schematic perspective side view of a snowmobile according to a preferred embodiment of the present invention.
Figure 2:
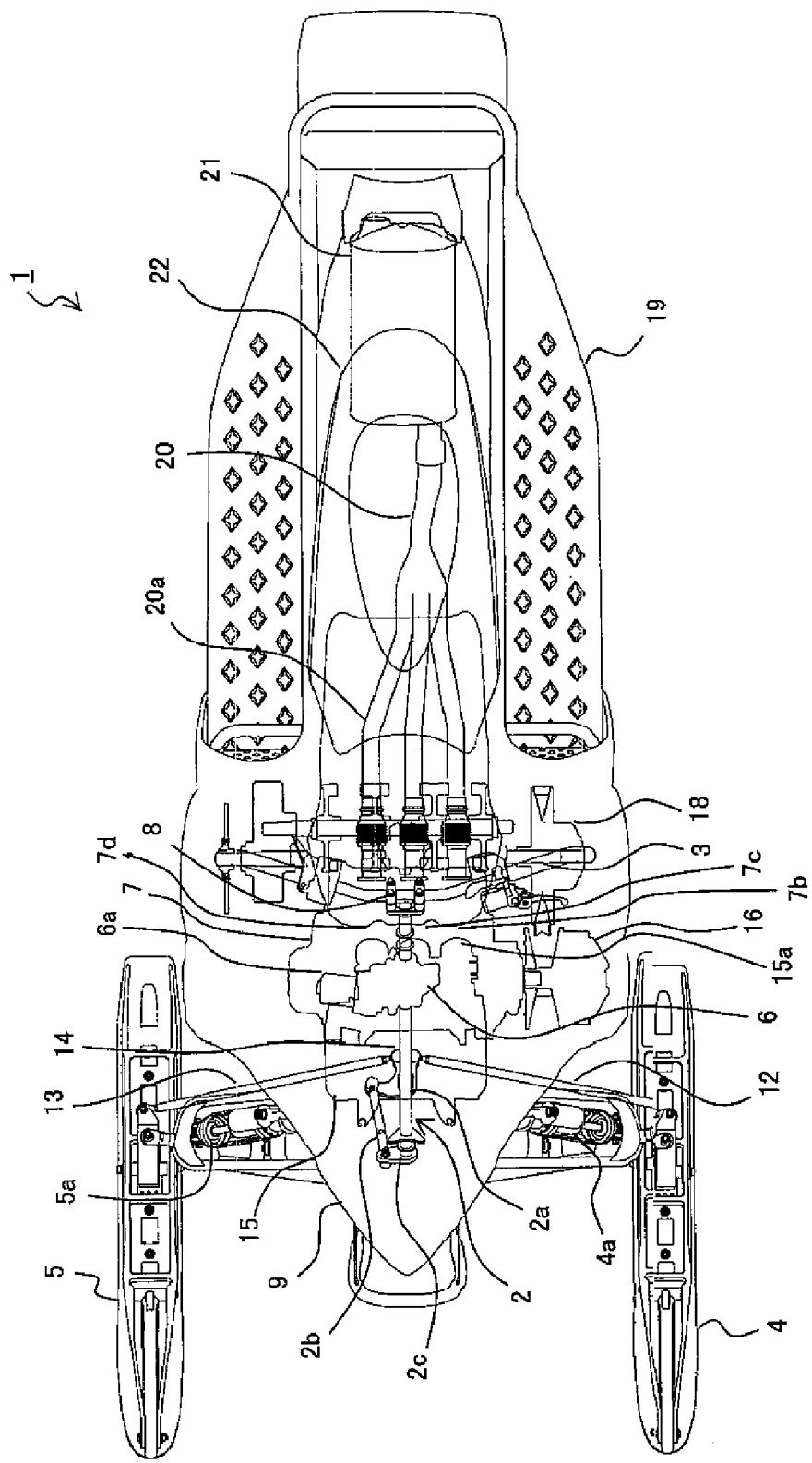
FIG. 2 is a schematic perspective plan view of the snowmobile according to the preferred embodiment of the present invention shown in FIG. 1.
Figure 3:
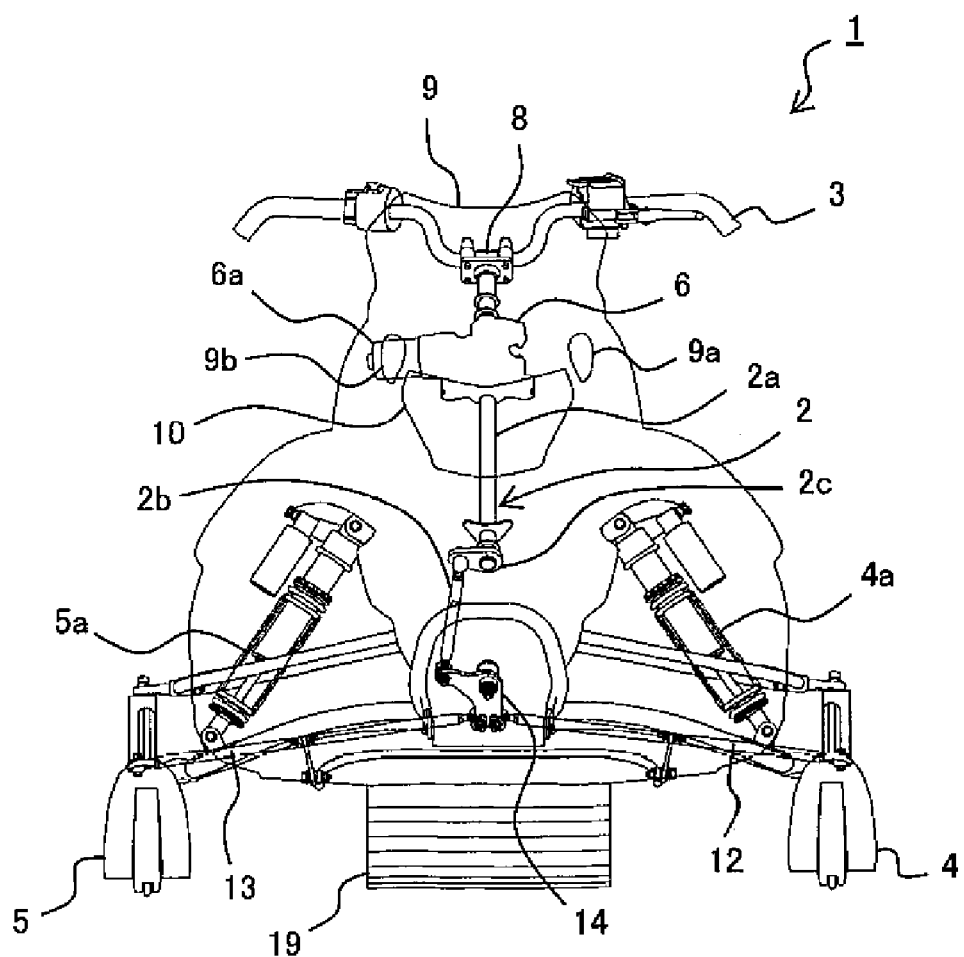
FIG. 3 is a schematic perspective front view of the snowmobile according to the preferred embodiment of the present invention shown in FIG. 1.

FIGS. 1, 2, and 3 are a perspective side view, a plan view, and a front view showing the schematic structure of a snowmobile according to a preferred embodiment of the present invention, respectively.

The snowmobile, denoted by numeral 1, includes a steering shaft 2, a handle 3, a pair of left and right steering skis 4 and 5, a power steering system 6, and an engine body 7.

The steering shaft 2 includes a first steering-force transfer section 2a and a second steering-force transfer section 2b.

The first steering-force transfer section 2a is connected to the handle 3 via a handle post 8, and transfers the steering force generated from the handle 3. The first steering-force transfer section 2a may be constructed of a plurality of components including a handle column.

The first steering-force transfer section 2a extends from the handle 3 downward toward the front of the snowmobile 1 (toward the left in FIGS. 1 and 2). In this preferred embodiment, the angle of inclination of the first steering-force transfer section 2a with respect to the horizontal direction is preferably about 45 degrees.

The first steering-force transfer section 2a is provided with the power steering system 6. As shown in FIGS. 2 and 3, the power steering system 6 includes an assist motor 6a serving as a power source for assisting steering. The assist motor 6a is therefore mounted to the first steering-force transfer section 2a.

As shown in FIG. 1, the assist motor 6a is located ahead of the uppermost portion 7a of the engine body 7 and above the engine body 7 (the uppermost portion 7a of the engine body 7). The uppermost portion of the engine of the present preferred embodiment indicates the uppermost portion 7a of only the engine body 7 and does not include an intake silencer 15 and an intake passage 15a which are described later.

The assist motor 6a is disposed inside a cowling 9 that defines the front surface of the snowmobile 1. The cowling 9 has a pair of left and right openings 9a and 9b for taking in outside air (running wind) at the upper rear of a headlight 10.

A duct 11 is disposed inside the cowling 9. The duct 11 is connected at the front end to the opening 9b on the right side of the snowmobile 1, and at the rear end directed to the assist motor 6a. As shown in FIG. 3, the opening 9b on the right side of the snowmobile 1 is provided at the position where at least a portion thereof overlaps with the assist motor 6a, as viewed from the front of the snowmobile.

The second steering-force transfer section 2b is connected to the first steering-force transfer section 2a via a ball joint 2c. The second steering-force transfer section 2b extends from the ball joint 2c downward toward the rear of the snowmobile 1. In this preferred embodiment, the angle of inclination of the second steering-force transfer section 2b with respect to the horizontal direction is about 45 degrees in the direction opposite to the first steering-force transfer section 2a. Therefore, in this preferred embodiment, the first steering-force transfer section 2a and the second steering-force transfer section 2b intersect substantially at a right angle.

The second steering-force transfer section 2b tilts the steering skis 4 and 5 on the basis of the steering force of the handle 3. Specifically, the second steering-force transfer section 2b is connected to a connecting portion 14 and a pair of left and right tie rods 12 and 13 connected to the steering skis 4 and 5, respectively. The second steering-force transfer section 2b pushes and pulls the connecting portion 14 by the turning motion of the first steering-force transfer section 2a that turns with the handle 3 to turn the connecting portion 14, thereby reciprocating the left and right tie rods 12 and 13 to the right and left.

Thus, the steering skis 4 and 5 are tilted in the direction of the steering of the handle 3. Dampers 4a and 5a are disposed between the steering skis 4 and 5 and frames (not shown), respectively.

As shown in FIG. 1, an intake silencer 15 is disposed between the engine body 7 and the steering shaft 2 (the first steering-force transfer section 2a). The intake silencer 15 is connected to the engine body 7 through an intake passage 15a. The intake silencer 15 and the intake passage 15a define an intake system. The intake system (in the present preferred embodiment, the intake passage 15a) is located between the engine body 7 and the assist motor 6a.

A first pulley 16 is disposed on the left side of the engine body 7. A second pulley 17 is disposed behind the first pulley 16. The power of the engine body 7 is transferred from the first pulley 16 to the second pulley 17 via a belt 18.

The second pulley 17 engages with a front axle 19a of a driving track unit 19 located in the rear center of the snowmobile 1. The driving track unit 19 further includes a track belt 19b in contact with the ground, a damper 19c, and wheels 19d disposed in various positions.

Referring to FIGS. 1 and 2, the engine body 7 is preferably a parallel three cylinder engine having three cylinders 7b, 7c, and 7d arranged in parallel in the vehicle width direction.

As shown in FIG. 1, the axis 7L of the three cylinders 7b, 7c, and 7d extends toward the rear in the slanting direction as viewed from the side of the snowmobile 1. The steering shaft 2 is arranged ahead of the engine body 7 and extends substantially parallel with the axis 7L of the cylinders 7b, 7c, and 7d as viewed from the side of the snowmobile 1 as shown in FIG. 1.

The engine body 7 is connected to a three forked exhaust pipe 20. The exhaust pipe 20 extends to the upper rear of the snowmobile 1, and is connected at the rear end to an exhaust silencer 21. The exhaust pipe 20 extends horizontally from the engine body 7 to bent portions 20a and extends from the bent portions 20a upward to the exhaust silencer 21.

A seat 22 is provided above the exhaust pipe 20. A fuel tank 23 is disposed ahead of the seat 22. The engine body 7 according to this preferred embodiment is preferably a parallel three cylinder engine of a dry sump type having a separate oil tank (not shown).

An engine room S according to this preferred embodiment is a space accommodating the engine body 7, the intake silencer 15, the first pulley 16, the second pulley 17, and the assist motor 6a.

In the foregoing preferred embodiment, the assist motor 6a is mounted to the steering shaft 2 and located ahead of the uppermost portion 7a of the engine body 7. The assist motor 6a can therefore be disposed in a position suitable for cooling such as a position that is likely to receive outside air (running wind) from ahead of the snowmobile 1. Consequently, according to the present preferred embodiment, the cooling capability of the assist motor 6a of the steering system 6 can be improved.

The assist motor 6a is located above the uppermost portion 7a of the engine body 7. This arrangement enables the assist motor 6a to be disposed in a position more suitable for cooling, thus further improving the cooling capability of the assist motor 6a.

The engine body 7 includes the three (plurality of) cylinders 7b, 7c, and 7d arranged in parallel in the width direction of the snowmobile 1, and the steering shaft 2 is arranged ahead of the engine body 7. This arrangement enables the assist motor 6a to be disposed in a space at the front of the snowmobile 1, thus further improving the cooling capability of the assist motor 6a.

The axis 7L of the cylinders 7b, 7c, and 7d extends to the rear in the slanting direction as viewed from the side of the snowmobile 1 (see FIG. 1). The steering shaft 2 extends substantially parallel with the axis 7L of the cylinders 7b, 7c, and 7d as viewed from the side of the snowmobile 1 (see FIG. 1). This arrangement provides a sufficient space at the front of the snowmobile 1 to enable the assist motor 6a to be disposed in a position more suitable for cooling, thus further improving the cooling capability of the assist motor 6a.

The exhaust pipe 20, which becomes relatively hot among the components associated with the engine body 7, extends to the rear of the snowmobile 1. This arrangement easily allows the space in the front of the snowmobile 1 to have a low temperature atmosphere, thus further improving the cooling capability of the assist motor 6a.

Furthermore, since the exhaust pipe 20 extends to the upper rear of the snowmobile 1, enough space for the fuel tank 23 and so on can be provided, thus further improving the cooling capability of the assist motor 6a.

Furthermore, since the exhaust pipe 20 extends horizontally from the engine body 7 to the bent portions 20a and extends upward to the exhaust silencer 21 in the rear of the snowmobile 1, more space for the fuel tank 23 and so on can be provided, thus further improving the cooling capability of the assist motor 6a.

Since the cowling 9 which accommodates the assist motor 6a has the openings 9a and 9b for taking in outside air (running wind), the cooling capability of the assist motor 6a can be further improved.

Since the openings 9a and 9b are provided at positions where at least a portion thereof overlaps with the assist motor 6a, the assist motor 6a can effectively take in the outside air (running wind), thus further improving the cooling capability of the assist motor 6a.

Since the duct 11 is disposed inside the cowling 9 in such a manner that the front end of the duct 11 is connected to at least one of the openings 9a and 9b and the rear end is directed to the assist motor 6a, the assist motor 6a can effectively take in outside air (running wind), thus further improving the cooling capability of the assist motor 6a.

The engine body 7 is of a dry sump type, and the assist motor 6a is disposed above the engine body 7. Accordingly, disposing the engine body 7 at the lower portion of the engine room S provides a large space between the engine body 7 and the assist motor 6a disposed thereabove. This reduces radiant heat from the engine body 7, thus further improving the cooling capability of the assist motor 6a.

Among the components associated with the engine body 7, a relatively low temperature intake unit (in this preferred embodiment, the intake passage 15a) is disposed between the assist motor 6a and the engine body 7. This reduces the radiant heat from the engine body 7, thus further improving the cooling capability of the assist motor 6a.

Since the assist motor 6a is mounted to the first steering-force transfer section 2a for transferring the steering force, the structure of the snowmobile 1 can be made simpler than that in which the assist motor 6a is mounted to the second steering-force transfer section 2b to facilitate disposing the assist motor 6a in a position with a high cooling capability, thus further improving the cooling capability of the assist motor 6a.

Since the first steering-force transfer section 2a is located close to the handle 3, while the second steering-force transfer section 2b is located close to the steering skis 4 and 5, the structure of the snowmobile 1 can be simplified to facilitate disposing the assist motor 6a in a position with a high cooling capability, thus further improving the cooling capability of the assist motor 6a.

The assist motor 6a is disposed on the portion of the first steering-force transfer section 2a adjacent to the handle 3. Accordingly, disposing the assist motor 6a on the first steering-force transfer section 2a simplifies the structure of the snowmobile 1, enabling the assist motor 6a and the engine body 7 to be disposed at a specified spacing, thus further improving the cooling capability of the assist motor 6a. Moreover, disposing the assist motor 6a close to the driver stabilizes the balance of the snowmobile 1.

While preferred embodiments of the present invention have been described above, it is to be understood that variations and modifications will be apparent to those skilled in the art without departing the scope and spirit of the present invention. The scope of the present invention, therefore, is to be determined solely by the following claims.

What is claimed is:

1. A snowmobile comprising:
an engine room accommodating an engine;
a steering shaft arranged to transfer a steering force generated by the steering of a handle to steering skis; and
an assist motor accommodated in the engine room and assisting the steering force; wherein
the assist motor is mounted to the steering shaft and located ahead of an uppermost portion of the engine in a traveling direction of the snowmobile.

2. The snowmobile according to claim 1, wherein the assist motor is located above the uppermost portion of the engine.

3. The snowmobile according to claim 1, wherein the engine includes a plurality of cylinders arranged substantially parallel to a width direction of the snowmobile, and the steering shaft is arranged ahead of the engine.

4. The snowmobile according to claim 3, wherein the axis of the plurality of cylinders extends toward the rear in a slanting direction as viewed from the side of the snowmobile, and the steering shaft extends substantially parallel with the axis of the plurality of cylinders as viewed from the side of the snowmobile.

5. The snowmobile according to claim 1, further comprising an exhaust pipe connected to the engine and extending to a rear of the snowmobile.

6. The snowmobile according to claim 1, further comprising an intake unit located between the assist motor and the engine.

7. The snowmobile according to claim 1, further comprising a cowling defining a front surface of the snowmobile, wherein the cowling has an opening for taking in outside air, and the assist motor is disposed inside the cowling.

8. The snowmobile according to claim 7, wherein the opening is arranged in a position where at least a portion of the opening overlaps with the assist motor as viewed from a front of the snowmobile.

9. The snowmobile according to claim 7, further comprising a duct inside the cowling, wherein the duct is connected at a front end to the opening, and a rear end of the duct is directed at the assist motor.

10. The snowmobile according to claim 1, wherein the engine is a dry sump engine, and the assist motor is disposed above the engine.

* * * * *